US012031031B2

(12) United States Patent
Watanabe (10) Patent No.: US 12,031,031 B2
(45) Date of Patent: Jul. 9, 2024

(54) EMULSION COMPOSITION, A COATING AGENT AND A LAMINATE

(71) Applicant: Nissin Chemical Industry Co., Ltd., Echizen (JP)

(72) Inventor: Kentaro Watanabe, Echizen (JP)

(73) Assignee: NISSIN CHEMICAL INDUSTRY CO., LTD., Echizen (JP)

( * ) Notice: Subject to any disclaimer, the term of this patent is extended or adjusted under 35 U.S.C. 154(b) by 146 days.

(21) Appl. No.: 17/192,666

(22) Filed: Mar. 4, 2021

(65) Prior Publication Data

US 2021/0277239 A1 Sep. 9, 2021

(30) Foreign Application Priority Data

Mar. 6, 2020 (JP) ................................. 2020-039184
Mar. 1, 2021 (JP) ................................. 2021-031432

(51) Int. Cl.
*C08L 83/04* (2006.01)
*C08F 220/06* (2006.01)
(Continued)

(52) U.S. Cl.
CPC ............ *C08L 83/04* (2013.01); *C08F 220/06* (2013.01); *C08F 220/20* (2013.01); *C08G 77/16* (2013.01);
(Continued)

(58) Field of Classification Search
CPC ........ C08L 83/04; C08L 57/00; C08L 101/00; C08L 2201/10; C08L 2201/52;
(Continued)

(56) References Cited

U.S. PATENT DOCUMENTS

| 6,147,142 A * | 11/2000 | Geck ..................... C09D 7/65 |
| | | 525/902 |
| 2009/0149573 A1* | 6/2009 | Venzmer ............ C09D 151/085 |
| | | 428/404 |
| 2016/0177408 A1* | 6/2016 | Watanabe ................ C09D 7/42 |
| | | 252/8.57 |

FOREIGN PATENT DOCUMENTS

| CN | 101362865 A | 2/2009 |
| CN | 105088728 A | 11/2015 |

(Continued)

*Primary Examiner* — Robert S Jones, Jr.
*Assistant Examiner* — Jiangtian Xu
(74) *Attorney, Agent, or Firm* — Birch, Stewart, Kolasch & Birch, LLP (57) ABSTRACT

One object of the present invention is to provide an emulsion composition comprising a silicone and an emulsion of a resin having a film forming property, which emulsion composition may provide a coating agent which effectively exhibits slidability of silicone on a substrate, while maintaining transparency. Another object of the present invention is to provide a laminate having a film made of the coating agent. The present invention provides an emulsion composition comprising (I) an emulsion of a resin having a film forming property in a solid content of 60 to 99.9 parts by mass and (II) an emulsion of a silicone-acrylic core-shell resin in solid content of 0.1 to 40 parts by mass, a total mass of the solid contents of components (I) and (II) being 100 parts by mass, wherein a core of the silicone-acrylic core-shell resin (II) is composed of an organopolysiloxane (A), a shell layer of the silicone-acrylic core-shell resin (II) is composed of a poly(meth)acrylate ester (B), a mass ratio of the organopolysiloxane (A) to the poly(meth)acrylate ester (B) is in a range of 40:60 to 95:5, and a covering ratio by the poly(meth)acrylate ester on a surface of the silicone-acrylic core-shell resin is at least 50%.

10 Claims, 1 Drawing Sheet

(51) Int. Cl.
    *C08F 220/20*    (2006.01)
    *C08G 77/00*     (2006.01)
    *C08G 77/16*     (2006.01)
    *C08G 77/18*     (2006.01)
    *C08L 57/00*     (2006.01)
    *C08L 101/00*    (2006.01)

(52) U.S. Cl.
    CPC .............. *C08G 77/18* (2013.01); *C08G 77/80* (2013.01); *C08L 57/00* (2013.01); *C08L 101/00* (2013.01); *C08G 2150/00* (2013.01); *C08L 2201/10* (2013.01); *C08L 2201/52* (2013.01); *C08L 2203/16* (2013.01); *C08L 2207/53* (2013.01)

(58) Field of Classification Search
    CPC .............. C08L 2203/16; C08L 2207/53; C08F 220/06; C08F 220/20; C08G 77/16; C08G 77/18; C08G 77/80; C08G 2150/00
    See application file for complete search history.

(56)            References Cited

FOREIGN PATENT DOCUMENTS

JP         3-281556 A       12/1991
JP        2013-67787 A       4/2013

\* cited by examiner

EMULSION COMPOSITION, A COATING AGENT AND A LAMINATE

CROSS REFERENCE

This application claims the benefits of Japanese Patent Application Nos. 2020-039184 filed on Mar. 6, 2020 and 2021-31432 filed on Mar. 1, 2021 the contents of which are herein incorporated by reference.

TECHNICAL FIELD

The present invention relates to an emulsion composition suitable for coating, and more particularly, relates to an emulsion composition which gives a film which has high transparency and provides slidability on a surface of a substrate. Further, the present invention relates to a laminate having a film made of a coating agent containing the emulsion composition.

BACKGROUND OF THE INVENTION

In recent years, in the field of coating agents, a dispersion medium has been changed from organic solvents to aqueous media for environmental problems. Urethane, acryl and vinyl chloride emulsions have an excellent film forming property and, therefore, have been widely used as a coating agent.

A silicone resin is known to be capable of providing slidability to a substrate. However, when a silicone resin is used as a coating agent, there is a problem that the coating film looks white.

Therefore, it was tried to mix a silicone resin with a urethane, acryl, or vinyl chloride emulsion which has a film forming property to prepare a coating agent. However, in reality, this impairs the slidability of the silicone resin or the intrinsic properties of the urethane, acryl or vinyl chloride resin, so that satisfactory performance is not attained.

The present inventor disclosed, in Japanese Patent Application Laid-Open No. 2013-67787, that a coating agent comprising a mixture of a urethane, acryl or vinyl chloride emulsion with a silicone resin provides water repellency to a substrate. However, the slidability and the transparency of the coating film need to be improved.

PRIOR ART LITERATURE

Patent Literature

Patent Literature 1: Japanese Patent Application Laid-Open No. 2013-67787

SUMMARY OF THE INVENTION

Problems to be Solved by the Invention

The present inventors found an emulsion composition having improved slidability and transparency of the coating film as described in Japanese Patent Application No. 2018-186635, but the preparation process of an emulsion of a silicone-acrylic graft copolymer resin was complicated. Accordingly, it is desired to provide an emulsion composition and a coating agent which may be prepared easier and provide a coating film having improved slidability and transparency.

Under the aforesaid circumstances, one object of the present invention is to provide an emulsion composition comprising a silicone and an emulsion of a resin having a film forming property, which emulsion composition may provide a coating agent which effectively exhibits slidability of silicone on a substrate, while maintaining transparency. Another object of the present invention is to provide a laminate having a film made of the coating agent.

Means to Solve the Problems

As a result of extensive research, the present inventor has found that an emulsion composition comprising a predetermined ratio of an emulsion of a resin having a film forming property and an emulsion of a silicone-acrylic core-shell resin having a specific structure provides a coating agent capable of solving the aforesaid problems, and thus has completed the present invention.

That is, the present invention provides an emulsion composition comprising
  (I) an emulsion of a resin having a film forming property in a solid content of 60 to 99.9 parts by mass and
  (II) an emulsion of a silicone-acrylic core-shell resin in solid content of 0.1 to 40 parts by mass,
  a total mass of the solid contents of components (I) and (II) being 100 parts by mass,
  wherein a core of the silicone-acrylic core-shell resin (II) is composed of an organopolysiloxane (A), a shell layer of the silicone-acrylic core-shell resin (II) is composed of a poly(meth)acrylate ester (B), a mass ratio of the organopolysiloxane (A) to the poly(meth)acrylate ester (B) is in a range of 40:60 to 95:5, and a covering ratio by the poly(meth)acrylate ester on a surface of the silicone-acrylic core-shell resin is at least 50%.

The present invention further provides an emulsion composition comprising
  (a) a resin having a film forming property of 60 to 99.9 parts by mass,
  (b) a silicone-acrylic core-shell resin of 0.1 to 40 parts by mass,
  a total mass of the components (a) and (b) being 100 parts by mass,
  and (c) water,
  wherein a core of the silicone-acrylic core-shell resin is composed of an organopolysiloxane (A), a shell layer of the silicone-acrylic core-shell resin is composed of a poly(meth)acrylate ester (B), a mass ratio of the organopolysiloxane (A) to the poly(meth)acrylate ester (B) is in a range of 40:60 to 95:5, and a covering ratio by the poly(meth)acrylate ester on a surface of the silicone-acrylic core-shell resin is at least 50%.

Effects of the Invention

The emulsion composition of the present invention gives a coating which has excellent transparency and slidability. The coating may be applied on a substrate without impairing the appearance of the substrate to provide a laminate which has high abrasion resistance. Further, the emulsion composition of the present invention is of an aqueous system, so that it has large advantages in workability and environmental protection.

EMBODIMENTS FOR PRACTICING THE INVENTION

The present invention provides an emulsion composition comprising
(I) a resin emulsion having a film forming property in a solid content of 60 to 99.9 parts by mass and
(II) an emulsion of a silicone-acrylic core-shell resin in solid content of 0.1 to 40 parts by mass,
a total mass of the solid contents of components (I) and (II) being 100 parts by mass,
wherein a core of the silicone-acrylic core-shell resin (II) is composed of an organopolysiloxane (A), a shell layer of the silicone-acrylic core-shell resin (II) is composed of a poly(meth)acrylate ester (B), a mass ratio of the organopolysiloxane (A) to the poly(meth)acrylate ester (B) is in a range of 40:60 to 95:5, and a covering ratio by the poly(meth)acrylate ester on a surface of the silicone-acrylic core-shell resin is at least 50%.

Each component will be explained below in detail.

In the present invention, the film forming property means that when an emulsion is applied on a substrate and dried at a predetermined temperature, a surface of the resulting coating film does not have particle-like unevenness, neither fine crack. The predetermined temperature for drying to form the film is not particularly limited, but is preferably 30 to 150° C., more preferably 100 to 150° C. The emulsion of the resin in the present invention may be an aqueous emulsion. The solid content of the emulsion is usually 20 to 60% by mass, preferably 25 to 55% by mass, more preferably 30 to 50% by mass.

The resin emulsion having the film forming property may be any known ones, and is preferably an emulsion of a urethane resin, a vinyl chloride resin, an acrylic resin, a styrene-butadiene-acrylonitrile resin, a polyester resin or an amide resin. Examples of the resin include acrylic resins composed of a (meth)acrylic monomer such as (meth)acrylic acid and (meth)acrylic ester, urethane resins, and vinyl chloride resins, such as polyvinyl cholorides, vinyl chloride/vinyl acetate copolymers, vinyl chloride/(meth)acrylic acid copolymers, and vinyl chloride/(meth) acrylate copolymer. Examples of the (meth) acrylic monomer include methyl acrylate, ethyl acrylate, butyl acrylate, 2-ethylhexyl acrylate, methyl methacrylate, acrylic acid, methacrylic acid, and crotonic acid. The average particle diameter of the emulsion particles is preferably 10 to 750 nm, more preferably 10 to 500 nm, so that the emulsion of these resins has a film forming property. The average particle size of the emulsion particles may be determined by a TEM.

It is preferred that the aforesaid resin has a glass transition temperature (hereinafter, sometimes referred to as Tg) of 120° C. or less. The upper limit of the glass transition temperature is preferably 60° C. or less, more preferably 30° C. or less. The lower limit of the glass transition temperature is preferably −50° C. The glass transition temperatures may be determined according to the Japan Industrial Standards (JIS) K 7121.

A glass transition temperature of a copolymer particle is calculated from glass transition temperatures of each homopolymer composed of each comonomer and amounts of comonomer according to the following equation.

$$(Pa+Pb+Pc)/T=(Pa/Ta)+(Pb/Tb)+(Pc/Tc)$$

wherein T is a glass transition temperature (K) of copolymer particles, Pa, Pb and Pc are a content (in % by mass) of comonomers a, b and c, respectively, and Ta, Tb and Tc are a glass transition temperature (K) of a homopolymer of comonomers a, b and c, respectively.

The resin emulsion having a film forming property may be prepared by any known method, for example, an emulsion polymerization method using an anion or a nonionic emulsifier. Alternatively, commercially available products may be used.

Examples of the commercially available acrylic resin emulsions include an acrylic type VINYBLAN (trade name) ex Nissin Chemical Industry Co., Ltd., YODOSOL (trade name) ex Henkel Japan Co., and ARON (trade name) ex Toa Synthesis Co., Ltd.

Examples of the commercially available polyether-based urethane resin emulsion include Adeka Bon-Tighter HUX 350 (trade name) ex Adeca Co., Ltd., WLS-201 (trade name) and WLS-202 (trade name) ex DIC Corporation, SUPER-FLEX E-4000 (trade name) and E-4800 (trade name) ex Dai-ichi Kogyo Seiyaku Co., Ltd.

Examples of the polycarbonate-based urethane resin emulsion include Hydran WLS-210 (trade name) and WLS-213 (trade name) ex DIC Corporation, UW-1005E (trade name) and UW-5502 (trade name), ex Ube Industries, Ltd., PERMARIN UA-368 (trade name) ex Sanyo Chemical Co., Ltd., SuperFlex 460 (trade name) and SuperFlex 470 (trade name) ex Daiichi Industrial Pharmaceutical Co., Ltd.

Examples of the polyester-based urethane resin emulsion include Adeka Bon-Tighter HUX-380 (trade name) and HUX-540 (trade name), ex Adeca Co., Ltd., SUPERFLEX 420 (trade name) and SUPERFLEX 860 (trade name) ex Dai-ichi Kogyo Seiyaku Co., Ltd.

Examples of the commercially available vinyl chloride resin emulsion include vinyl chloride-type VINYBLAN (trade names) ex Nissin Chemical Industries, Ltd., wherein the chloride-type resin is a copolymer of a vinyl chloride with an acrylic acid ester or a vinyl acetate.

In the emulsion composition of the present invention, the amount of component (I) is such that a solid content of component (I) is 60 to 99.9 parts by mass, preferably 65 to 95 parts by mass, based on total 100 parts by mass of the solid contents of component (I) and component (II). If the solid content of component (I) is less than the aforesaid lower limit, coating properties such as abrasion resistance are extremely low, which is problematic. If the solid content of component (I) exceeds the aforesaid upper limit, a surface of a coating film is not smooth, so that the tactile feeling is bad, which is problematic.

Component (II) is an emulsion of the silicone-acrylic core-shell resin. In the silicone-acrylic core-shell resin, the core comprises an organopolysiloxane (A), and the shell layer comprises a poly(meth)acrylate ester (B). A mass ratio of component (A) to component (B), (A):(B), is in a range of 40:60 to 95:5, preferably 50:50 to 85:15. Hereinafter, the silicone acrylic core-shell resin in the emulsion will be described in more detail.

The silicone acrylic core-shell resin of the present invention is characterized in that a covering ratio by the poly (meth)acrylate ester on a surface of the silicone-acrylic core-shell resin is at least 50%, preferably at least 60%, more preferably at least 70%, still more preferably at least 90%, still more preferably at least 93%, and particularly preferably at least 95%, whereby the silicone-acrylic core-shell resin may disperse well, when emulsion (II) of the silicone-acrylic core-shell resin is mixed with emulsion (I). Specifically, the covering ratio by the poly(meth)acrylate ester on a surface of the silicone-acrylic core-shell resin is a ratio in % of a length (p) of the part of the circumference occupied by the poly(meth)acrylate ester to a whole circumferential length (a) of the silicone-acrylic core-shell resin. That is, the covering ratio (Z) is defined by the following formula.

Covering ratio(Z)=[(β)/(α)]×100

α and β are determined on TEM images. A diameter of a core-shell particle is measured on a TEM image of a core-shell particle, from which a theoretical circumferential length (a) is calculated. On a TEM image, a dark part of the particle is occupied by the organopolysiloxane, and a grey part is occupied by the poly(meth)acrylate ester. If a dark part is seen on the circumference of the particle, this means that this part of the circumference is not covered by the poly(meth)acrylate ester. A length (L) of the dark part, if any, on the circumference of the particle is measured. Then, β=α−L.

When the entire core particle is covered with poly(meth)acrylate ester, the value of L is 0% and the covering ratio (Z) is 100%.

Figure 2:
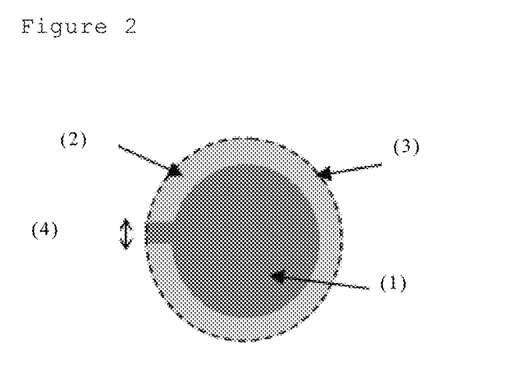
FIG. 2 is a schematic depiction on a silicone-acrylic core-shell resin particle.

In FIG. 2, (1) indicates the core composed of the organopolysiloxane; (2) indicates the shell composed of the poly(meth)acrylate ester; (3) indicates the whole circumference whose length is a; and (4) indicates a dark part on the circumference, occupied by the organopolysiloxane, whose length is L.

The silicone-acrylic core-shell resin (II) is prepared preferably by core-shell polymerization, i.e., reacting a (meth)acrylate ester monomer (b) and, if necessary, a functional group-containing monomer (c) copolymerizable with a (meth) acrylate ester monomer (b), on a core comprising an organopolysiloxane (a) represented by the following general formula (1).

(1)

In formula (1), R 1 is, independently of each other, a substituted or unsubstituted, monovalent hydrocarbon group having 1 to 20 carbon atoms, other than an aryl group, and $R^2$ is a phenyl group, X is, independently of each other, a substituted or unsubstituted, monovalent hydrocarbon group having 1 to 20 carbon atoms, an alkoxy group having 1 to 20 carbon atoms, or a hydroxy group, and Y is, independently of each other, a group defined for X, or a group represented by —[O—Si(X)$_2$]$_d$—X, provided that at least one of the groups represented by X and Y is a hydroxyl group, wherein a is the number of 0 or more, 0.3≤b/(a+b+c+e)≤1, 0≤c/(a+b+c+e)≤0.6, 0≤e/(a+b+c+e)≤0.1, and d is the number of 0 to 10.

$R^1$ is a substituted or unsubstituted, monovalent hydrocarbon group having 1 to 20 carbon atoms other than an aryl group, such as alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl, and cyclohepty groups. The substituted monovalent hydrocarbon group include alkyl groups substituted with a halogen atom, an acryloxy group, a methacryloxy group, a carboxy group, an alkoxy group, an alkenyloxy group, an amino group, or a (meta)acryloxy-substituted amino group. $R^1$ is preferably an alkyl group, further preferably a methyl group.

X is, independently of one another, a substituted or unsubstituted, monovalent hydrocarbon group having 1 to 20 carbon atoms, an alkoxy group having 1 to 20 carbon atoms or a hydroxy group. The monovalent hydrocarbon group is, for example, an alkyl group having 1 to 20 carbon atoms or an aryl group having 6 to 20 carbon atoms. Besides a hydroxy group, X include, a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group, a cyclopentyl group, a cyclohexyl group, a cycloheptyl group, a phenyl group, a tolyl group, a naphthyl group, a methoxy group, an ethoxy group, a propoxy group, a butoxy group, a hexyloxy group, a heptyloxy group, an octyloxy group, a decyloxy group, and a tetradecyloxy group. The substituted alkyl group includes those mentioned for $R^1$.

Y is, independently of each other, a group defined for X, or a group represented by —[O—Si(X)$_2$]$_d$—X, as described above, wherein d is the number of from 0 to 10, preferably from 0 to 5.

A method for preparing the organopolysiloxane (a) represented by formula (1) is not particularly limited. For example, it may be prepared by ring-opening polymerization of a cyclic organosiloxane. Examples of the cyclic organosiloxane include hexamethylcyclotrisiloxane (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra[3-(p-vinylphenyl)propyl]tetramethylcyclotetrasiloxane, 1,3,5,7-tetra (N-acryloyl-N-methyl-3-aminopropyl)tetramethylcyclotetrasiloxane, and 1,3,5,7-tetra(N,N-bis(lauroyl)-3-aminopropyl)tetramethylcyclotetrasiloxane.

A catalyst for polymerization of the cyclic organosiloxane is preferably a strong acid, such as hydrochloric acid, sulfuric acid, dodecylbenzenesulfonic acid, citric acid, lactic acid, and ascorbic acid. Dodecylbenzenesulfonic acid which has an emulsifying ability is preferred.

In the ring-opening emulsion polymerization, a surfactant is preferably used, such as anionic surfactants, for instance, sodium lauryl sulfate, sodium laureth sulfate, N-acylamino acid salt, N-acyltaurine salt, aliphatic soap, and alkyl phosphate. Among them, those which are easily soluble in water and do not have a polyethylene oxide chain are preferred, more preferably, N-acylamino acid salts, N-acyltaurine salts, aliphatic soaps and alkyl phosphates, particularly preferably, sodium lauroylmethyltaurine and sodium myristoylmethyltaurine. Emulsion particles comprising the organopolysiloxane represented by formula (1) are obtained in the ring-opening emulsion polymerization in the presence of such a surfactant.

A temperature in the ring-opening emulsion polymerization of the cyclic organosiloxane is preferably 50 to 75° C.

A polymerization time is preferably 10 hours or more, more preferably 15 hours or more. The reaction mixture is preferably aged at 5 to 30° C. for 10 hours or more after the polymerization.

The (meth) acrylate ester (b) (hereinafter sometimes referred to as acrylic component) in the present invention refers to an acrylate ester monomer or methacrylate ester monomer which does not have a functional group such as a hydroxy group, an amide group, or a carboxy group. Preferably, the acrylic acid alkyl ester or alkyl methacrylate ester has an alkyl group having 1 to 10 carbon atoms. Preferably, a polymer of the acryl component has a glass transition temperature (hereinafter, sometimes referred to as Tg) of 40° C. or higher, more preferably 60° C. or higher. Examples of such a monomer include methyl methacrylate, isopropyl methacrylate, ethyl methacrylate, cyclohexyl methacrylate, and butyl acrylate. The upper limit of Tg is preferably 200° C. or lower, more preferably 150° C. or lower. The glass transition temperature is determined according to the Japan Industrial Standards (JIS) K7121.

Further, a functional group-containing monomer (c) copolymerizable with the (meth) acrylate ester (b) may be further reacted. The functional group-containing monomer (c) may be a (meth) acrylate monomer having a carboxy group, an amide group, a hydroxy alkyl group, and an unsaturated bond such as a vinyl group, or an allyl group. Examples thereof include methacrylic acid, acrylic acid, acrylamide, allyl methacrylate, vinyl methacrylate, 2-hydroxyethyl methacrylate, and 2-hydroxypropyl methacrylate. These comonomers improve compatibility between the core-shell resin and a thermoplastic resin. Methacrylic acid, acrylic acid, and 2-hydroethyl methacrylate are particularly preferred.

In the preparation of the emulsion of the silicone-acrylic core-shell resin, an amount of the (meth) acrylic acid ester (b) is preferably from 10 to 150 parts by mass, more preferably from 20 to 100 parts by mass, per 100 parts by mass of the organopolysiloxane (a). If the amount of component (b) is too small, it is difficult to form particles. If the amount of component (b) is too large, slidability of a molded article is insufficient. Where component (c) is incorporated, its amount is preferably 0.01 to 50 parts by mass, more preferably 0.01 to 20 parts by mass, still more preferably 0.01 to 10 parts by mass, per 100 parts by mass of component (a). If the amount of component (c) is too large, it is necessary to add a large amount of the obtained silicone-acrylic core-shell resin emulsion to the resin emulsion (I) to attain sufficient slidability of a molded article.

In order to prepare the silicone-acrylic core-shell resin emulsion (II), the (meth) acrylate ester (b) and, if necessary, the functional group-contain monomer (c) copolymerizable therewith is (are) radically polymerized on the particles comprising the polyorganosiloxane (a) in the emulsion. Specifically, the polyorganosiloxane (a) is emulsified in water in the presence of an anionic surfactant and, to which, then, the (meth) acrylate ester (b) and, if necessary, the functional group-contain monomer (c) copolymerizable therewith is(are) added in a almost-continuous dropwise manner or portion-wise in 2 to 10 aliquots in the presence of a radical initiator at a temperatures of 25 to 55° C., in a predetermined period of time of 2 to 8 hours. If the components (b) and (c) are fed at one go, core-shell particles might not be formed.

Examples of the radical initiator include persulfates such as potassium persulfate and ammonium persulfate, aqueous hydrogen persulfate, t-butyl hydroperoxide, and hydrogen peroxide. If necessary, use may be made, in the reaction system, of a redox system with a reducing agent, such as sodium hydrogen sulfite, Rongalite, L-ascorbic acid, tartaric acid, saccharides, and amines. The amount of the radical initiator is 0.1 to 5 parts by mass, preferably 0.5 to 3 parts by mass, relative to 100 parts by mass of the (meth) acrylate ester.

The anionic surfactant may be incorporated in the reaction system to improve stability of the reaction system, such as sodium lauryl sulfate, sodium laureth sulfate, N-acylamino acid salt, N-acyltaurine salt, aliphatic soap, and alkyl phosphate. A nonionic emulsifier may also be incorporated, such as polyoxyethylene lauryl ether and polyoxylene tridecyl ether. The amount of the surfactant is 0.1 to 5 parts by mass, relative to 100 parts by mass of the (meth) acrylate ester.

A polymerization temperature of component (b) and, if any, (c) is preferably 25 to 55° C., more preferably 25 to 40° C. A polymerization time is preferably 2 to 8 hours, more preferably 3 to 6 hours.

Further, a chain transfer agent may be added to adjust a molecular weight of the polymer.

The silicone-acrylic core-shell resin in emulsion (II) thus obtained comprises a core comprising the polyorganosiloxane (a) and a shell layer comprising the polymer of the component (b) (and, optionally, component (c)). A covering ratio is at least 50%, preferably at least 60%, more preferably at least 70%, particularly preferably at least 90%, and particularly preferably at least 95%, of a whole circumferential length (a) of the silicone-acrylic core-shell resin (II). More specifically, the poly(meth)acrylate ester is attached to a surface of the polyorganosiloxaxane core.

A solid content in the silicone-acrylic core-shell resin emulsion is preferably 35 to 50% by mass. A viscosity of the emulsion at 25° C. is preferably 500 mPa·s or less, more preferably 50 to 500 mPa·s. The viscosity is determined with a rotary viscometer.

The average particle diameter in the emulsion of the silicone-acrylic core-shell resin (II) is preferably 50 to 400 nm. The particle diameter is determined on an image taken by a TEM.

The average particle diameter of the core of the silicone-acrylic core-shell resin (II) is preferably 20 to 300 nm, more preferably 50 to 250 nm. The diameter of the core is a diameter of a central dark part on an image taken by a TEM.

A thickness of the shell of the silicone-acrylic core-shell resin is preferably 1 to 50 nm, more preferably 5 to 30 nm. The thickness of the shell is a half of a difference between the average diameter of the core and the average particle diameter of the silicone-acrylic core-shell resin (II).

The amount of the silicone acrylic core-shell resin emulsion (II) is such that the solid content of component (II) is 0.1 to 40 parts by mass, preferably 5 to 30 parts by mass, per total 100 parts by mass of the solid contents of components (I) and (II) in the composition. If the amount of component (II) is less than the aforesaid lower limit, abrasion resistance of the coating is not improved at all. If the amount of component (II) is larger than the aforesaid upper limit, the coating looks whitish and has less abrasion resistance.

The emulsion composition of the present invention is obtained by mixing the emulsion of the resin having a film forming property (I) and the silicone-acrylic core-shell resin emulsion (II) in water with any known mixing method such as a propeller-type stirrer or a homogenizer.

The emulsion composition of the present invention may further comprise an antioxidant, a colorant, an ultraviolet absorber, a light stabilizer, an antistatic agent, a plasticizer, a flame retardant, a thickener, a surfactant, an organic solvent such as a film forming aid, and other resins, as long as the properties of the emulsion are not adversely affected.

The emulsion composition of the present invention may be applied by coating or dipping on one or both sides of a substrate, as a coating agent, and dried at a temperature of from room temperature to 150° C. to form a film. Examples of the substrate include plastics (PET, PI, and synthetic leather), glass (general-purpose glass and $SiO_2$), metals (Si, Cu, Fe, Ni, Co, Au, Ag, Ti, Al, Zn, Sn, Zr, and their alloys), wood, fibers (cloth, yarn), paper, and ceramics (calcined oxides, carbides or nitrides). The film made of the coating agent of the present invention provides the substrate with the silicone resin properties such as improved water repellency, weather resistance, heat resistance, cold resistance, gas permeability and slidability over a long period of time, while maintaining the advantage of the film-forming resin. This is probably because the resin having a film forming property and the curable silicone resin constitute a firm sea-island structure.

The plastic substrate may be made of poly(meth)acrylic acid esters such as polymethylmethacrylate, polycarbonate, polystyrene, polyethylene terephthalate, polyvinyl chloride, polyester, cellulose, di(ethylene glycol) bis(allyl carbonate) polymer, acrylonitrile/butadiene/styrene polymer, polyurethane or epoxy resin. Plastic articles include automotive interior materials, organic glass, electrical materials and building materials, exterior materials for buildings, optical films used in liquid crystal displays, light diffusion films, cellular phones, and home electric appliances. For the drying, a coated article may be left at room temperature for 1 to 10 days. However, for rapid curing, a coated article is preferably heated at a temperature of 20 to 150° C. for 1 second to 10 hours. When the plastic substrate is made of a material which tends to cause deformation or discoloration by heat, the coated article is preferably dried at a relatively low temperature of 20 to 100° C.

The glass substrates may be made of soda-lime glass, quartz glass, lead glass, borosilicate glass and alkali-free glass. Glass articles include pane glasses for construction, glass for vehicles, lenses, mirrors, display panels and solar cell module glass. For the drying, the coated article may be left at room temperature for about 1 to 10 days or heated at a temperature of 20 to 150° C., particularly 60 to 150° C., for 1 second to 10 hours.

The wood substrate may be made of woods of Aceraceae, Betulaceae, Lauraceae, Castanea, Scrophulariaceae, Araucariaceae, Ulmaceae, Bignoniaceae, Rosaceae, Cupressaceae, Dipterocarpaceae, Myrtaceae, Fagaceae, Pinaceae, Fabaceae and Oleaceae. Wood articles may be a processed or shaped wood; plywood, laminated wood, and processed or shaped ones thereof; and combinations thereof. Examples of such include residential building exterior or interior materials, furniture such as desks, wood toys, and musical instruments. In particular, the drying method is hot air drying at 20 to 150° C., preferably 50 to 150° C., for 0.5 to 5 hours. The drying at 120° C. below does not cause discoloration of the coating film.

Examples of the fiber substrate may be made of cotton, linen, wool, silk, cashmere, asbestos, polyamide, polyester, viscose, cellulose, glass and carbon. Processed fiber products include all types of fabrics, knitted fabrics, nonwoven fabrics, films, and paper. For the drying, a coated substrate may be left at room temperature for 10 minutes to several tens hours or at a temperature of 20 to 150° C. for 0.5 minute to 5 hours.

The method for applying the coating composition to a substrate is not limited and includes, for example, coating with various coaters such as gravure coaters, bar coaters, blade coaters, roll coaters, air knife coaters, screen coaters, curtain coaters, and brushes; spraying; and dipping.

An amount of the coating composition of the present invention to be applied on the substrate is not particularly limited. However, for an antifouling property and workability, the coating composition is usually applied preferably in such an amount as to give a solid content of 1 to 300 g/m 2, more preferably 5 to 100 g/m 2, or as to provide a film thickness after dried of 1 to 500 μm, preferably 5 to 100 μm. The applied composition may be left in atmospheric conditions to be dried or heated to 100 to 200° C. to be dried so as to form a film.

EXAMPLES

The present invention will be explained below in further detail with reference to a series of the Examples and the Comparative Examples. However, the present invention is in no way limited by these Examples. In the following Examples, part and percentage are part by mass and percentage by mass, respectively.

Preparation of (I) Emulsion of a Resin Having a Film Forming Property

Preparation Example 1

Preparation of a Poly(Vinyl Chloride) Resin Emulsion

Air in a polymerization reactor equipped with a stirrer, a condenser, a thermometer and a nitrogen gas inlet was replaced with a nitrogen gas and, then, 67 parts by mass of ion-exchanged water, 4 parts by mass of PELEX SSL (anionic surfactant, sodium alkyl diphenyl ether disulfonate, ex Kao Corporation), 5 parts by mass of NOIGEN L-6190 (nonionic surfactant, ex DKS Co. Ltd.), 52 parts by mass of vinyl chloride, and 48 parts by mass of 2-ethylhexyl acrylate were placed in the polymerization reactor and heated to 60° C. with stirring. Further, a solution of 0.3 part by mass of ammonium persulfate (initiator) dissolved in 10 parts by mass of ion-exchanged water and a solution of 0.1 part by mass of sodium bisulfite dissolved in 3 parts by mass of ion-exchanged water were added and subjected to polymerization for 5 to 15 hours in this redox system.

After an internal pressure of the polymerization reactor became 0 MPa, the remaining monomer was removed to be 1000 ppm in a vacuum and, then, an internal temperature is lowered to 40° C. or less to obtain a polymer. Thereafter, a preservative and ion-exchanged water were added to the polymer to obtain an emulsion of the poly(vinyl chloride) resin, specifically a vinyl chloride/acrylic acid copolymer, having a nonvolatile content of 43% and a Tg of −3° C.

Preparation Example 2

Preparation of an Acrylic Resin Emulsion

In a 2-liter (hereinafter, abbreviated as "2 L") glass flask equipped with a stirring device, a thermometer and a reflux condenser, were placed 104 parts by mass of ion-exchanged water and an oxygen gas was purged.

A solution of 2 parts by mass of Aqualon HS-10 (polyoxyethylene nonylpropenylphenyl ether ammonium sulfate, ex DKS Co. Ltd.) dissolved in 26 parts by mass of ion-exchanged water was added to a mixture of 57 parts by mass of ethyl acrylate, 42 parts by mass of methyl methacrylate, 1 part by mass of 80% methacrylic acid, and emulsified by a homomixer. This emulsion was added dropwise into the 2 L glass flask over a period of 5 to 7 hours to cause a radical polymerization under a redox reaction between a peroxide and a reducing agent at 50° C. so as to obtain an emulsion of an acrylic resin, specifically ethyl acrylate/methyl methacrylate copolymer resin, having a nonvolatile content of 40.4% and a Tg of 20° C.

Preparation of an Emulsion of a Silicone-Acrylic Core-Shell Resin (II)

Preparation Example 3

600 Grams of octamethylcyclotetrasiloxane, a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 44.8% after dried at 105° C. for 3 hours. The organopolysiloxane in the emulsion was in a state of a non-flowable soft gel.

The structure of the organopolysiloxane in the emulsion was as follows:

wherein two of X are a methyl group, one of X is a hydroxy group, and R¹ is a methyl group.

To the emulsion, 125 g of ion-exchanged water was added and, then, 232 g of methyl methacrylate (MMA) was added dropwise over a period of 3 to 5 hours under a redox reaction between a peroxide and a reducing agent at 30° C. to form a polymethyl methacrylate (PMMA) shell layer on a surface of the silicone emulsion particles, so that an emulsion having a solid content of 45.2% was obtained.

Preparation Example 4

600 Grams of octamethylcyclotetrasiloxane, a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm 2 twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 44.8% after dried at 105° C. for 3 hours, and the organopolysiloxane in the emulsion was in a state of a non-flowable soft gel.

The structure of the organopolysiloxane in the emulsion was as follows:

wherein two of X are a methyl group, one of X is a hydroxy group, and R¹ is a methyl group.

To the emulsion, 50 g of ion-exchanged water was added and, then, 95 g of methyl methacrylate (MMA) was added dropwise over a period of 3 to 5 hours under a redox reaction between a peroxide and a reducing agent at 30° C. to form a polymethyl methacrylate (PMMA) shell layer on a surface of the silicone emulsion particles, so that an emulsion having a solid content of 45.0% was obtained.

Preparation Example 5

600 Grams of octamethylcyclotetrasiloxane, a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 44.8% after dried at 105° C. for 3 hours, and the organopolysiloxane in the emulsion was in a state of a non-flowable soft gel.

The structure of the organopolysiloxane in the emulsion was as follows:

wherein two of X are a methyl group, one of X is a hydroxy group, and R¹ is a methyl group.

To the emulsion, 442 g of ion-exchanged water was added and, then, 807 g of methyl methacrylate (MMA) was added dropwise over a period of 3 to 5 hours under a redox reaction between a peroxide and a reducing agent at 30° C. to form a polymethyl methacrylate (PMMA) shell layer on a surface of the silicone emulsion particles, so that an emulsion having a solid content of 45.3% was obtained.

Preparation Example 6

300 Grams of octamethylcyclotetrasiloxane, 300 g of diphenyldimethylsiloxane (KF-54, ex Shin-Etsu Chemical Co., Ltd.), a solution of 24 g of 50% sodium alkyl diphenyl ether disulfonate (PELEX SS-L, ex Kao Corporation) in 45 g of pure water, and a solution of 6 g of dodecylbenzene sulfonate in 54 g of pure water were placed in a 2 L beaker made of polyethylene, and uniformly emulsified by a homomixer, which was then diluted by adding 490 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 55° C. for 10 to 20 hours, followed by aging at 10° C. for 10 to hours and neutralization around a neutral point with 12 g of a 10% aqueous solution of sodium carbonate to obtain an emulsion. The emulsion had a non-volatile content (solid content) of 47.5% after dried at 105° C. for 3 hours, and the organopolysiloxane in the emulsion was in a state of a non-flowable soft gel.

The structure of the organopolysiloxane in the emulsion was as follows:

wherein two of X are a methyl group, one of X is a hydroxy group, $R^1$ is a methyl group and $R^2$ is a phenyl group. To the emulsion, 167 g of ion-exchanged water was added and, then, 249 g of methyl methacrylate (MMA) was added dropwise over a period of 3 to 5 hours under a redox reaction between a peroxide and a reducing agent at 30° C. to form a polymethyl methacrylate (PMMA) shell layer on a surface of the silicone emulsion particles, so that an emulsion having a solid content of 45.6% was obtained.

Preparation Example 7

600 Grams of octamethylcyclotetrasiloxane, 1 g of hexamethyldisiloxane (M2), a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 45.4% after dried at 105° C. for 3 hours, and the organopolysiloxane in the emulsion was in a state of a non-flowable soft gel.

The structure of the organopolysiloxane in the emulsion was as follows:

wherein $R^1$ is a methyl group, and all of X are a methyl group.

To the emulsion, 133 g of ion-exchanged water was added and, then, 160 g of methyl methacrylate (MMA) and 74 g of butyl acrylate (BA) were added dropwise over a period of 3 to 5 hours under a redox reaction between a peroxide and a reducing agent at 30° C. to form a polymethyl methacrylate (PMMA) shell layer on a surface of the silicone emulsion particles, so that an emulsion having a solid content of 44.9% was obtained.

Preparation Example 8

600 Grams of octamethylcyclotetrasiloxane, a solution of 12 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 44.8% after dried at 105° C. for 3 hours, and the organopolysiloxane in the emulsion was in a state of a non-flowable soft gel.

The structure of the organopolysiloxane in the emulsion was as follows:

wherein two of X are a methyl group, one of X is a hydroxy group, and $R^1$ is a methyl group.

To the emulsion, 125 g of ion-exchanged water was added and, then, 232 g of methyl methacrylate (MMA) was added dropwise over a period of 3 to 5 hours under a redox reaction between a peroxide and a reducing agent at 30° C. to form a polymethyl methacrylate (PMMA) shell layer on a surface of the silicone emulsion particles, so that an emulsion having a solid content of 45.1% was obtained.

Comparative Preparation Example 1

600 Grams of octamethylcyclotetrasiloxane, a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 44.8% after dried at 105° C. for 3 hours, and the organopolysiloxane in the emulsion was in a state of a non-flowable soft gel.

The structure of the organopolysiloxane in the emulsion was as follows:

wherein two of X are a methyl group, one of X is a hydroxy group, and R¹ is a methyl group.

To the emulsion, 125 g of ion-exchanged water was added and, then, 232 g of methyl methacrylate (MMA) was added at one go and stirred for 1 hour. Then, a peroxide and a reducing agent were added dropwise at 30° C. over a period of 3 to 5 hours over a period of 3 to 5 hours to proceed with a redox reaction. A shell layer was not sufficiently formed and most of the methyl methacrylate (MMA) came into the cores. That is, the polymethyl methacrylate (PMMA) was brought in the emulsion particles in the obtained emulsion having a solid content of 45.4%. A covering ratio of the emulsion particles was 20%, as determined as will be described below.

Comparative Preparation Example 2

600 Grams of octamethylcyclotetrasiloxane, a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 44.8% after dried at 105° C. for 3 hours, and the organopolysiloxane in the emulsion was in a state of a non-flowable soft gel.

The structure of the organopolysiloxane in the emulsion was as follows:

wherein two of X are a methyl group, one of X is a hydroxy group, and R¹ is a methyl group.

To the emulsion, 689 g of ion-exchanged water was added and, then, 1256 g of methyl methacrylate (MMA) was added dropwise over a period of 3 to 5 hours under a redox reaction between a peroxide and a reducing agent at 30° C. to form a polymethyl methacrylate (PMMA) shell layer on a surface of the silicone emulsion particles, so that an emulsion having a solid content of 45.2% was obtained.

Comparative Preparation Example 3

600 Grams of octamethylcyclotetrasiloxane, a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 44.8% after dried at 105° C. for 3 hours, and the organopolysiloxane in the emulsion was in a state of a non-flowable soft gel.

The structure of the organopolysiloxane in the emulsion was as follows.

wherein two of X are a methyl group, one of X is a hydroxy group, and R¹ is a methyl group.

Reference Preparation Example

In Reference Preparation Example, a silane coupling agent (3-methacryloxypropylmethyldimethoxysilane, KBM-502, ex Shin-Etsu Chemical Co., Ltd.) was also used as a comonomer for the core in the composition as shown in Table 1. The thus-produced emulsion of organopolysiloxane having an unit having a methacryloxypropyl group, which siloxane is represented by the following formula (1'), was used to prepare a core-shell particle emulsion.

599.4 Grams of octamethylcyclotetrasiloxane, 0.6 g of KBM-502, a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60° C. for 24 hours, followed by aging at 10 to 20° C. for 24 hours and neutralization around a neutral point with 12 g of a 10% aqueous solution of sodium carbonate to obtain an emulsion. The emulsion had a non-volatile content (solid content) of 45.3% after dried at 105° C. for 3 hours, and the organopolysiloxane in the emulsion was in a state of a non-flowable soft gel.

The structure of the organopolysiloxane in the emulsion was as follows:

wherein two of X are a methyl group, one of X is a hydroxy group, $R^1$ is a methyl group, $R^3$ is a methacryloxypropyl group, and Z is a methyl group.

To the emulsion, 125 g of ion-exchanged water was added and, then, 232 g of methyl methacrylate (MMA) was added dropwise over a period of 3 to 5 hours under a redox reaction between a peroxide and a reducing agent at 30° C. to form a polymethyl methacrylate (PMMA) shell layer on a surface of the silicone emulsion particles, so that an emulsion having a solid content of 45.1% was obtained.

Determination of a Covering Ratio

The used TEM was JEM-2100™, ex JEOL Ltd. A covering ratio (Z) is defined by the following formula.

Covering ratio(Z)=[(β)/(α)]×100

FIG. 2 is a schematic view of a core-shell particle. In FIG. 2, (1) indicates a core comprising organopolysiloxane; (2), a shell layer comprising poly(meth)acrylate); (3), circumference of the core-shell particle; and (4), a dark part which is occupied by organopolysiloxane and lacks poly(meth) acrylate). A diameter of a core-shell particle was measured on a TEM image of a core-shell particle (see FIG. 1), from which a theoretical circumferential length (α) was calculated. A length (L) of the dark part on the circumference of the particle was measured. Then, β=α−L.

When the entire core particle is covered with the shell, the value of L is 0 and the covering ratio (Z) is 100%. The measurement was conducted on at least ten particles on the TEM image to obtain an average.

Determination of a Solid Content

Approximately 1 g of each of the silicone-acrylic core-shell resin emulsion (sample) obtained in the Examples and the Comparative Examples was placed in an aluminum foil dish having dimensions of 70φ×12 h in mm and accurately weighed, placed in a dryer kept at about 105° C., left for 1 hour, then taken out from the dryer, allowed to cool in a desiccator, and weighed. A solid content was calculated by the following formula.

$$R = \frac{T-L}{W-L} \times 100$$

R: Solid content in %
W: Mass in gram of the aluminum foil dish and the undried sample
L: Mass in gram of the aluminum foil dish
T: Mass in gram of the aluminum foil dish and the dried sample Determination of an Average Particle Diameter of the Silicone-Acrylic Core-Shell Resin A diameter of a particle was measured on an image taken by a TEM, JEM-2100™, ex JEOL Ltd.

Determination of a Shell Thickness

The silicone-acrylic core-shell resin emulsion was diluted 5000 times, applied on a grid, and dried at room temperature, whose image was then taken by a TEM, JEM-2100™, ex JEOL Ltd. The thickness of the shell is a half of a difference between the average particle diameter of the core and the average particle diameter of the silicone-acrylic core-shell resin particle. The measurement was done on at least ten particles (N=10) on the TEM image to obtain an average.

Figure 1:
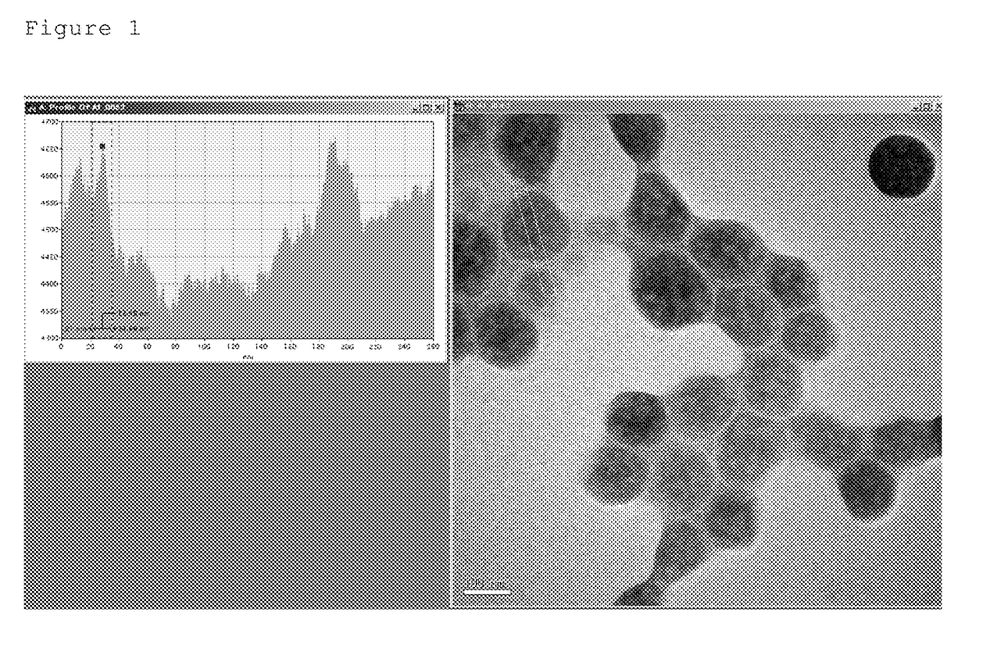
FIG. 1 shows a transmission electron microscope (TEM) image of the silicone-acrylic core-shell resin particles obtained in Example 1 and graphical data thereof.

FIG. 1 shows the TEM image of the silicone-acrylic core-shell resin of Example 1. The graph was taken in one measurement among ten measurements (N=10). The thickness of the shell layer there is 13.5 nm. The average out of N=10 is 15 nm.

The compositions in part by mass and the physical properties of the organopolysiloxanes contained in the emulsions are summarized in the following Table 1. The pH shown in the Table was a pH of the dispersion medium in the emulsion at 25° C. The weight average molecular weight, Mw, was determined by gel permeation chromatography (GPC) with THF as a solvent at 25° C., and reduced to polystyrene.

TABLE 1

| | | Preparation Example | | | | | Comp. Preparation Example | | | Ref. Ex |
|---|---|---|---|---|---|---|---|---|---|---|
| | | 3 | 4 | 5 | 6 | 7 | 1 | 2 | 3 | 1 |
| Composition | D4<sup>X</sup> | 100 | 100 | 100 | 50 | 100 | 100 | 100 | 100 | 99.9 |
| | KF-54<sup>X</sup> | 0 | 0 | 0 | 50 | 0 | 0 | 0 | 0 | 0 |
| | M2 | | | | | 0.17 | | | | |
| | Silane Coupling Agent, KBM-502 | 0 | 0 | 0 | 0 | 0 | 0 | 0 | 0 | 0.1 |
| | Solid Content, % | 44.8 | 44.8 | 44.8 | 47.5 | 45.4 | 44.8 | 44.8 | 44.8 | 45.3 |
| | pH | 6.9 | 6.9 | 6.9 | 6.8 | 7.1 | 6.9 | 6.9 | 7.1 | 6.9 |
| | Mw, GPC | 250,000 | 250,000 | 250,000 | 8,000 | 110,000 | 250,000 | 250,000 | 250,000 | 250,000 |

<sup>X</sup>D4 is octamethylcyclotetrasiloxane, KF-54 is diphenyldimethylsiloxane, and M2 is hexamethyldisiloxane.

The compositions in part by mass and the properties of the silicone-acrylic core-shell resins were as shown in Table 2 below.

TABLE 2

| | Preparation Example | | | | | | Comp. Preparation Example | | | Ref. Ex. |
|---|---|---|---|---|---|---|---|---|---|---|
| | 3 | 4 | 5 | 6 | 7 | 8 | 1 | 2 | 3 | 1 |
| Organopolysiloxane | 70 | 85 | 40 | 70 | 70 | 70 | 70 | 20 | — | 70 |
| Methyl methacrylate | 30 | 15 | 60 | 30 | 20 | 30 | 30 | 80 | | 30 |
| Butyl acrylate | | | | | 10 | | | | | |

TABLE 2-continued

|  | Preparation Example | | | | | | Comp. Preparation Example | | | Ref. Ex. |
| --- | --- | --- | --- | --- | --- | --- | --- | --- | --- | --- |
|  | 3 | 4 | 5 | 6 | 7 | 8 | 1 | 2 | 3 | 1 |
| Covering ratio | 100 | 100 | 100 | 100 | 100 | 68 | 20 | 100 |  | 100 |
| Solid content, % | 45.2 | 45.0 | 45.3 | 45.6 | 44.9 | 45.1 | 45.5 | 45.2 |  | 45.1 |
| Av. particle diameter, nm | 152 | 144 | 187 | 240 | 166 | 132 | 589 | 225 |  | 148 |
| Thickness of the shell, nm | 15 | 10 | 25 | 13 | 15 | 10 | Not observed | 30 |  | 14 |
| Core diameter, nm | 122 | 124 | 137 | 214 | 136 | 111 |  | 165 |  | 120 |

Preparation and Evaluation of Emulsion Compositions

Example 1

As a polycarbonate-polyurethane resin emulsion, use was made of a product called "PERMARIN UA-368" (viscosity: 200 mPa·s at 25° C., average particle diameter: 300 nm, and solid content: about 5 wt %, ex Sanyo Chemical Industries, Ltd).

The emulsion of the silicon-acrylic graft copolymer resin obtained in Preparation Example 3 with a solid content of 45.2 wt % was added in the polyurethane resin emulsion with stirring in a solid content ratio described in Table 3, stirred for 10 minutes or more, and then filtered through an 80-mesh sieve to obtain an emulsion composition of Example 1.

Examples 2-24, Reference Examples 1-3, and Comparative Examples 1-15

In Examples 2 to 8, Reference Example 1 and Comparative Examples 1 to 5, the procedures in Example 1 were repeated, except that the composition was changed as described in Table 3, to obtain an emulsion composition containing the polycarbonate-polyurethane resin emulsion.

In Examples 9 to 16, Reference Example 2, and Comparative Examples 6 to 10, the procedures in Example 1 were repeated, except that the composition was changed as described in Table 5, to obtain an emulsion composition containing the acrylic resin emulsion obtained in Preparation Example 2.

In Examples 17 to 24, Reference Example 3, and Comparative Examples 11 to 15, the procesures in Example 1 were repeated, except that the composition was changed as described in Table 7, to obtain an emulsion composition containing the vinyl chloride resin emulsion obtained in Preparation Example 1.

The amount of the raw material described in Table 3, Table 5 and Table 7 is a mass of the solid content relative to total 100 parts by mass of the solid content of the resin emulsion and the solid content of the silicon-acrylic graft copolymer resin emulsion.

[Film Preparation Method]

Slide Glass, PET Film and Acrylic Board

The emulsion composition was applied on each of a slide glass, a PET film and an acrylic plate with a bar coater, and dried at 105° C.×3 minutes to form a coating film having a thickness of about 23 μm.

[Determination of a Haze Value]

A haze value of the aforesaid coating film on the slide glass was determined with "Haze Meter NDH7000" ex Nippon Denshoku Industries Co., Ltd. A haze value of the slide glass itself is 0.70%.

[Increase in Haze]

The increase in haze was calculated according the following equation.

When the increase was 3000% or less, transparency of the coating film is judged as high. A Preferred increase is 1000% or less. On the other hand, when the increase exceeds 3000%, transparency of the coating film is poor and looks whitish.

Increase in haze in %=[(Y−X)/X]×100

X: Haze value of a substrate
Y: Haze value of a film and a substrate.

Static/Dynamic Friction Coefficient

A friction force was determined using HEIDON TYPE-38 (ex. SHINTO Scientific Co. Ltd.), where a metal depresser of 200 g weight was brought into vertical contact with the film and moved at a speed of 3 cm/min to determine a friction force. A friction coefficient was calculated from the friction force in a conventional manner.

TABLE 3

|  |  | Example | | | | | | | | Comparative Example | | | | | Ref. Ex. |
| --- | --- | --- | --- | --- | --- | --- | --- | --- | --- | --- | --- | --- | --- | --- | --- |
|  | Solid content | 1 | 2 | 3 | 4 | 5 | 6 | 7 | 8 | 1 | 2 | 3 | 4 | 5 | 1 |
| PERMARIN UA-368, Polyurethane resin emulsion |  | 90 | 90 | 90 | 90 | 90 | 80 | 70 | 90 | 100 | 90 | 90 | 90 | 50 | 90 |
| Silicone-acrylic graft copolymer resin | Preparation Ex. 3 | 10 |  |  |  |  | 20 | 30 |  |  | 100 |  |  | 50 |  |
|  | Preparation Ex. 4 |  | 10 |  |  |  |  |  |  |  |  |  |  |  |  |
|  | Preparation Ex. 5 |  |  | 10 |  |  |  |  |  |  |  |  |  |  |  |
|  | Preparation Ex. 6 |  |  |  | 10 |  |  |  |  |  |  |  |  |  |  |
|  | Preparation Ex. 7 |  |  |  |  | 10 |  |  |  |  |  |  |  |  |  |
|  | Preparation Ex. 8 |  |  |  |  |  |  |  | 10 |  |  |  |  |  |  |
|  | Comparative Preparation Ex. 1 |  |  |  |  |  |  |  |  |  |  | 10 |  |  |  |

TABLE 3-continued

| Solid content | Example | | | | | | | | Comparative Example | | | | | Ref. Ex. |
|---|---|---|---|---|---|---|---|---|---|---|---|---|---|---|
| | 1 | 2 | 3 | 4 | 5 | 6 | 7 | 8 | 1 | 2 | 3 | 4 | 5 | 1 |
| Comparative Preparation Ex. 2 | | | | | | | | | | | 10 | | | |
| Comparative Preparation Ex. 3 | | | | | | | | | | | | 10 | | |
| Referential Preparation Ex. 1 | | | | | | | | | | | | | | 10 |

TABLE 4

| | | | Example | | | | | | | | Comparative Example | | | | | Ref. Ex. |
|---|---|---|---|---|---|---|---|---|---|---|---|---|---|---|---|---|
| | | | 1 | 2 | 3 | 4 | 5 | 6 | 7 | 8 | 1 | 2 | 3 | 4 | 5 | 1 |
| Evaluation | Slide glass | Haze, % | 4.9 | 5.3 | 4.2 | 4.7 | 4.2 | 8.2 | 11.0 | 5.5 | 0.9 | 13.0 | 4.0 | 12.5 | 45 | 5.0 |
| | | Increase in haze, % | 600 | 657 | 500 | 571 | 500 | 1071 | 1471 | 686 | 29 | 1757 | 471 | 1686 | 6329 | 614 |
| | | Static friction coefficient | 0.04 | 0.03 | 0.04 | 0.03 | 0.04 | 0.03 | 0.05 | 0.04 | 0.88 | 0.04 | 0.15 | 0.04 | 0.2 | 0.04 |
| | | Dynamic friction coefficient | 0.02 | 0.01 | 0.02 | 0.01 | 0.02 | 0.01 | 0.02 | 0.03 | 0.57 | 0.02 | 0.05 | 0.02 | 0.12 | 0.02 |
| | PET film | Static friction coefficient | 0.06 | 0.05 | 0.1 | 0.08 | 0.06 | 0.06 | 0.05 | 0.06 | 0.75 | 0.1 | 0.25 | 0.09 | 0.34 | 0.07 |
| | | Dynamic friction coefficient | 0.02 | 0.02 | 0.03 | 0.02 | 0.03 | 0.02 | 0.02 | 0.02 | 0.43 | 0.02 | 0.1 | 0.03 | 0.14 | 0.02 |
| | Acrylic plate | Static friction coefficient | 0.08 | 0.06 | 0.1 | 0.06 | 0.07 | 0.06 | 0.06 | 0.09 | 0.51 | 0.08 | 0.2 | 0.07 | 0.22 | 0.08 |
| | | Dynamic friction coefficient | 0.04 | 0.03 | 0.05 | 0.04 | 0.04 | 0.03 | 0.03 | 0.04 | 0.4 | 0.04 | 0.1 | 0.03 | 0.12 | 0.07 |

TABLE 5

| Solid content | | Example | | | | | | | | Comparative Example | | | | | Ref. Ex. |
|---|---|---|---|---|---|---|---|---|---|---|---|---|---|---|---|
| | | 9 | 10 | 11 | 12 | 13 | 14 | 15 | 16 | 6 | 7 | 8 | 9 | 10 | 2 |
| Acrylic resin emulsion obtained in Preparation Example 2 | | 90 | 90 | 90 | 90 | 90 | 80 | 70 | 90 | 100 | 90 | 90 | 90 | 50 | 90 |
| Silicone-acrylic graft copolymer resin | Preparation Ex. 3 | 10 | | | | | 20 | 30 | | | | | | 50 | |
| | Preparation Ex. 4 | | 10 | | | | | | | | | | | | |
| | Preparation Ex. 5 | | | 10 | | | | | | | | | | | |
| | Preparation Ex. 6 | | | | 10 | | | | | | | | | | |
| | Preparation Ex. 7 | | | | | 10 | | | | | | | | | |
| | Preparation Ex. 8 | | | | | | | | 10 | | | | | | |
| | Comparative Preparation Ex. 1 | | | | | | | | | | 10 | | | | |
| | Comparative Preparation Ex. 2 | | | | | | | | | | | 10 | | | |
| | Comparative Preparation Ex. 3 | | | | | | | | | | | | 10 | | |
| | Referential Preparation Ex. 1 | | | | | | | | | | | | | | 10 |

TABLE 6

| | | | Example | | | | | | | | Comparative Example | | | | | Ref. Ex. |
|---|---|---|---|---|---|---|---|---|---|---|---|---|---|---|---|---|
| | | | 9 | 10 | 11 | 12 | 13 | 14 | 15 | 16 | 6 | 7 | 8 | 9 | 10 | 2 |
| Evaluation | Slide glass | Haze, % | 9.1 | 10 | 8.4 | 8.9 | 8.9 | 15.1 | 19.8 | 9.5 | 1.0 | 19.5 | 7.2 | 25.3 | 58.3 | 9.3 |
| | | Increase in haze, % | 1200 | 1329 | 1100 | 1171 | 1171 | 2057 | 2786 | 1257 | 429 | 2686 | 929 | 3514 | 8229 | 1229 |
| | | Static friction coefficient | 0.24 | 0.2 | 0.25 | 0.23 | 0.24 | 0.19 | 0.18 | 0.25 | 0.89 | 0.24 | 0.45 | 0.26 | 0.51 | 0.24 |
| | | Dynamic friction coefficient | 0.13 | 0.08 | 0.15 | 0.1 | 0.13 | 0.08 | 0.07 | 0.14 | 0.73 | 0.13 | 0.2 | 0.08 | 0.25 | 0.11 |
| | PET film | Static friction coefficient | 0.29 | 0.27 | 0.31 | 0.27 | 0.28 | 0.24 | 0.22 | 0.27 | 0.51 | 0.29 | 0.35 | 0.25 | 0.41 | 0.28 |
| | | Dynamic friction coefficient | 0.11 | 0.1 | 0.13 | 0.09 | 0.11 | 0.1 | 0.1 | 0.12 | 0.45 | 0.11 | 0.22 | 0.14 | 0.23 | 0.1 |
| | Acrylic plate | Static friction coefficient | 0.25 | 0.22 | 0.28 | 0.23 | 0.25 | 0.24 | 0.24 | 0.24 | 0.71 | 0.25 | 0.42 | 0.24 | 0.52 | 0.24 |
| | | Dynamic friction coefficient | 0.09 | 0.1 | 0.12 | 0.09 | 0.09 | 0.11 | 0.1 | 0.09 | 0.36 | 0.09 | 0.15 | 0.1 | 0.18 | 0.1 |

TABLE 7

| | | Example | | | | | | | | Comparative Example | | | | | Ref. Ex. |
|---|---|---|---|---|---|---|---|---|---|---|---|---|---|---|---|
| Solid content | | 17 | 18 | 19 | 20 | 21 | 22 | 23 | 24 | 11 | 12 | 13 | 14 | 15 | 3 |
| Vinyl chloride resin emulsion obtained in Preparation Example 1 | | 90 | 90 | 90 | 90 | 90 | 80 | 70 | 90 | 100 | 90 | 90 | 90 | 50 | 90 |
| Silicone-acrylic graft copolymer resin | Preparation Ex. 3 | 10 | | | | 20 | 30 | | 100 | | | | 50 | |
| | Preparation Ex. 4 | | 10 | | | | | | | | | | | | |
| | Preparation Ex. 5 | | | 10 | | | | | | | | | | | |
| | Preparation Ex. 6 | | | | 10 | | | | | | | | | | |
| | Preparation Ex. 7 | | | | | 10 | | | | | | | | | |
| | Preparation Ex. 8 | | | | | | | 10 | | | | | | | |
| | Comparative Preparation Ex. 1 | | | | | | | | | 10 | | | | | |
| | Comparative Preparation Ex. 2 | | | | | | | | | | 10 | | | | |
| | Comparative Preparation Ex. 3 | | | | | | | | | | | 10 | | | |
| | Referential Preparation Ex. 1 | | | | | | | | | | | | | | 10 |

TABLE 8

| | | | Example | | | | | | | | Comparative Example | | | | | Ref. Ex. |
|---|---|---|---|---|---|---|---|---|---|---|---|---|---|---|---|---|
| | | | 17 | 18 | 19 | 20 | 21 | 22 | 23 | 24 | 11 | 12 | 13 | 14 | 15 | 3 |
| Evaluation | Slide glass | Haze, % | 4.1 | 4.8 | 3.8 | 3.9 | 3.8 | 7.4 | 10.8 | 4.3 | 1.0 | 12.3 | 3.5 | 11.5 | 29.9 | 4.0 |
| | | Increase in haze, % | 486 | 586 | 443 | 457 | 443 | 957 | 1443 | 514 | 43 | 1657 | 400 | 1543 | 4171 | 47 |
| | | Static friction coefficient | 0.13 | 0.11 | 0.15 | 0.13 | 0.13 | 0.12 | 0.12 | 0.12 | 0.4 | 0.13 | 0.22 | 0.15 | 0.24 | 0.14 |
| | | Dynamic friction coefficient | 0.08 | 0.06 | 0.09 | 0.08 | 0.08 | 0.07 | 0.08 | 0.07 | 0.33 | 0.09 | 0.1 | 0.09 | 0.13 | 0.07 |

TABLE 8-continued

|  |  | Example |  |  |  |  |  |  |  | Comparative Example |  |  |  |  | Ref. Ex. |
|---|---|---|---|---|---|---|---|---|---|---|---|---|---|---|---|
|  |  | 17 | 18 | 19 | 20 | 21 | 22 | 23 | 24 | 11 | 12 | 13 | 14 | 15 | 3 |
| PET film | Static friction coefficient | 0.16 | 0.14 | 0.18 | 0.15 | 0.16 | 0.14 | 0.15 | 0.16 | 0.66 | 0.15 | 0.28 | 0.18 | 0.41 | 0.15 |
|  | Dynamic friction coefficient | 0.08 | 0.07 | 0.08 | 0.08 | 0.08 | 0.08 | 0.08 | 0.09 | 0.49 | 0.09 | 0.12 | 0.1 | 0.18 | 0.07 |
| Acrylic plate | Static friction coefficient | 0.16 | 0.14 | 0.19 | 0.14 | 0.15 | 0.13 | 0.14 | 0.15 | 0.43 | 0.16 | 0.24 | 0.16 | 0.3 | 0.16 |
|  | Dynamic friction coefficient | 0.09 | 0.07 | 0.09 | 0.08 | 0.1 | 0.08 | 0.09 | 0.08 | 0.38 | 0.08 | 0.12 | 0.1 | 0.16 | 0.1 |

As understood from Tables 3 and 4, preferred ranges of a static friction coefficient and a dynamic friction coefficient of the polyurethane-based resin emulsion on each substrate are as follows.

Slide glass: the preferred static friction coefficient is 0.01 to 0.10 and the preferred dynamic friction coefficient is 0.01 to 0.03.

PET film: the preferred static friction coefficient is 0.01 to 0.10 and the preferred dynamic friction coefficient is 0.01 to 0.03.

Acrylic plate: the preferred static friction coefficient is 0.01 to 0.10 and the preferred dynamic friction coefficient is 0.01 to 0.05.

The preferable haze value of the polyurethane-based resin film is 0.7 to 11.0%.

As understood from Tables 5 and 6, preferred ranges of a static friction coefficient and a dynamic friction coefficient of the acrylic resin emulsion on each substrate are as follows.

Slide glass: the preferred static friction coefficient is 0.01 to 0.25 and the preferred dynamic friction coefficient is 0.01 to 0.15.

PET film: the preferred static friction coefficient is 0.01 to 0.30 and the preferred dynamic friction coefficient is 0.01 to 0.15.

Acrylic plate: the preferred static friction coefficient is 0.01 to 0.30 and the preferred dynamic friction coefficient is 0.01 to 0.15.

The preferable haze value of the acrylic resin film is 0.7 to 20.0%.

As understood from Tables 7 and 8, preferred ranges of a static friction coefficient and a dynamic friction coefficient of the poly(vinyl chloride) resin emulsion on each substrate are as follows.

Slide glass: the preferred static friction coefficient is 0.01 to 0.20 and the preferred dynamic friction coefficient is 0.01 to 0.12.

PET film: the preferred static friction coefficient is 0.01 to 0.20 and the preferred dynamic friction coefficient is 0.01 to 0.12.

Acrylic plate: the preferred static friction coefficient is 0.01 to 0.20 and the preferred dynamic friction coefficient is 0.01 to 0.12.

The preferable haze value of the poly(vinyl chloride) resin film is 0.7 to 11.0%.

As seen in Tables 3 to 8, the coating film obtained from the emulsion composition comprising the siloxane emulsion of Comparative Preparation Example 2 which did not meet the present requirement on a mass ratio in the core-shell structure showed a large coefficient of friction so as to be inferior in slidability.

The coating film obtained from the emulsion composition comprising the silicone-acrylic core-shell resin emulsion of Comparative Preparation Example 1 in which the covering ratio by the acrylic resin in the core-shell particles was too small is inferior in transparency.

The emulsion of the organopolysiloxane of Comparative Preparation Example 3 having no silicone-acrylic core-shell structure had poor dispersibility and transparency of the coating film obtained was poor.

The coating film obtained from the emulsion composition of the present invention has high transparency and excellent slidability. Further, the emulsion composition of the present invention provides a film having excellent transparency and slidability comparable to those of the emulsions composition of Reference Examples 1 to 3 containing the silicone acrylic resin prepared using, as previously, a silane coupling agent (Comparative Preparation Example).

INDUSTRIAL APPLICABILITY

The coating film obtained from the emulsion composition of the present invention has excellent transparency and slidability. The emulsion composition of the present invention is suitably used as a coating agent for various substrates, and provides a laminate which maintains high abrasion resistance without impairing the appearance of the substrate. Further, the emulsion composition of the present invention is an aqueous type emulsion and therefore has large advantages in workability and environmental protection.

The invention claimed is:

1. An emulsion composition comprising
   (I) a resin emulsion having a film forming property in a solid content of 60 to 99.9 parts by mass and
   (II) an emulsion of a silicone-acrylic core-shell resin in solid content of 0.1 to 40 parts by mass,
   a total mass of the solid contents of components (I) and (II) being 100 parts by mass,
   wherein a core of the silicone-acrylic core-shell resin (II) is composed of an organopolysiloxane (A), wherein the organopolysiloxane (A) is represented by the following general formula (1), (1)

wherein $R^1$ is, independently of each other, an alkyl group having 1 to 20 carbon atoms, $R^2$ is a phenyl group, X is, independently of each other, an alkyl group having 1 to 20 carbon atoms, an aryl group having 6 to 20 carbon atoms, an alkoxy group having 1 to 20 carbon atoms, or a hydroxy group, and Y is a group defined for X, provided that at least one of the groups represented by X is a hydroxyl group and at least one of the groups represented by Y is a hydroxyl group, wherein a is the number of 0 or more, $0.3 \leq b/(a+b+c+e) \leq 1$, $0 \leq c/(a+b+c+e) \leq 0.6$ and $0 \leq e/(a+b+c+e) \leq 0.1$,
   a shell layer of the silicone-acrylic core-shell resin (II) is composed of a poly(meth)acrylate ester (B), a mass ratio of the organopolysiloxane (A) to the poly(meth)acrylate ester (B) is in a range of 40:60 to 95:5, and a covering ratio by the poly(meth)acrylate ester on a surface of the silicone-acrylic core-shell resin is at least 50%.

2. The emulsion composition according to claim 1, wherein the shell layer in the silicone-acrylic core-shell resin has a thickness of 1 nm to 50 nm.

3. The emulsion composition according to claim 1, wherein the resin having a film forming property is at least one selected from the group consisting of a urethane resin, a vinyl chloride resin, an acrylic resin, a styrene-butadiene-acrylonitrile resin, a polyester resin and an amide resin.

4. A coating agent comprising the emulsion composition according to claim 1.

5. A laminate comprising a substrate and a coating on one or both sides of the substrate, wherein the coating is composed of the coating agent according to claim 4.

6. The laminate according to claim 5, wherein a material of the substrate is a plastic selected from the group consisting of polycarbonate, polystyrene, polyethylene terephthalate, polyvinyl chloride, polyester, cellulose, di(ethylene glycol) bis(allyl carbonate)polymer, acrylonitrile/butadiene/styrene polymer, poly(meth)acrylic acid ester, polyurethane and an epoxy resin.

7. The laminate according to claim 5, wherein a material of the substrate is glass selected from the group consisting of soda-lime glass, quartz glass, lead glass, borosilicate glass and alkali-free glass.

8. The laminate according to claim 5, wherein a material of the substrate is wood selected from the group consisting of woods of Aceraceae, Betulaceae, Lauraceae, Castanea, Scrophulariaceae, Araucariaceae, Ulmaceae, Bignoniaceae, Rosaceae, Cupressaceae, Dipterocarpaceae, Myrtaceae, Fagaceae, Pinaceae, Fabaceae and Oleaceae.

9. The laminate according to claim 5, wherein a material of the substrate is fiber selected from the group consisting of cotton, linen, wool, silk, cashmere, asbestos, polyamide, polyester, viscose, cellulose, glass and carbon.

10. The laminate according to claim 5, wherein the coating has a thickness of 0.5 to 50 μm.

* * * * *